United States Patent [19]

Fujiwara

[11] 4,119,554

[45] Oct. 10, 1978

[54] CERAMIC DIELECTRIC COMPOSITION CONTAINING ALKALI METAL OXIDE

[75] Inventor: Shinobu Fujiwara, Akita, Japan

[73] Assignee: TDK Electronics Co., Ltd., Tokyo, Japan

[21] Appl. No.: 823,261

[22] Filed: Aug. 10, 1977

Related U.S. Application Data

[63] Continuation-in-part of Ser. No. 683,955, May 6, 1976, abandoned, which is a continuation of Ser. No. 481,141, Jun. 20, 1974, abandoned.

[51] Int. Cl.$^2$ ................................................. H01B 3/12
[52] U.S. Cl. ................................... 252/63.2; 252/63.5; 106/71; 106/73; 106/73.3; 106/73.31
[58] Field of Search ............................ 252/63.2, 63.5; 106/39.8, 46, 73.3, 73.31, 71, 73

[56] References Cited

U.S. PATENT DOCUMENTS

| | | | |
|---|---|---|---|
| 3,352,697 | 11/1967 | Fujiwara et al. | 106/73.3 |
| 3,709,704 | 1/1973 | Matsuo et al. | 252/63.5 X |
| 3,869,398 | 3/1975 | Yamaoka et al. | 252/63.5 |
| 3,933,668 | 1/1976 | Takahashi et al. | 252/63.5 |
| 4,017,320 | 4/1977 | Fujiwara et al. | 106/73.3 |
| 4,058,404 | 11/1977 | Fujiwara et al. | 252/63.5 X |

FOREIGN PATENT DOCUMENTS 689,238  3/1953  United Kingdom.

*Primary Examiner*—Harris A. Pitlick
*Attorney, Agent, or Firm*—Burgess, Ryan and Wayne

[57] ABSTRACT

A ceramic dielectric composition is provided including 35 to 93.5% by weight of $SrTiO_3$, 4 to 40% by weight of $Bi_2O_3$, at least 2.5% but less than 60% by weight of $TiO_2$, and 0.1 to 5.0% by weight, of an alkali metal oxide based on the total amount of $SrTiO_3$, $Bi_2O_3$ and $TiO_2$. The ceramic dielectric composition has a high dielectric constant and low dielectric loss and exhibits reduced variations of dielectric constant and the dielectric loss with respect to variation of an applied voltage.

7 Claims, No Drawings

CERAMIC DIELECTRIC COMPOSITION CONTAINING ALKALI METAL OXIDE

This application is a continuation in part application of U.S. Pat. application, Ser. No. 683,955, filed May 6, 1976 now abandoned, which, in turn, is a continuation application of U.S. Pat. application Ser. No. 481,141, filed June 20, 1974, now abandoned.

The present invention relates generally to a ceramic dielectric composition, and more particularly relates to a composition for a ceramic dielectric which has a high dielectric constant and low dielectric loss. Further, in the ceramic dielectric of the present invention, the variations of the dielectric constant and the dielectric loss with respect to a wide variation of applied voltages are respectively, very small.

Ceramic dielectrics with a high dielectric constant and low dielectric loss and also without variation of the dielectric constant and dielectric loss with respect to wide variation of an applied voltage, would be very useful when utilized in certain high AC voltage apparatuses or circuits. Examples of such apparatuses or circuits are; vacuum or gas circuit breakers and arresters or ceramic bushings in which ceramic dielectrics are used for the purpose of improving the uniformity of the distribution of high AC voltages; transmission systems in which ceramic dielectrics are used to absorb the surge voltage, and; impulse voltage measuring devices in which ceramic dielectrics act as voltage dividers. Ceramic dielectrics, having the characteristics mentioned above, would also be very useful in such high DC voltage apparatuses for circuits as, for example, the voltage multiplying rectifiers of television receivers or oscilloscopes.

In the prior art, the ceramic dielectric compositions for high AC and DC voltages, utilized in the above-mentioned apparatus or circuits, consisted essentially of barium titanate and a small quantity of other materials such as other metal titanates. As an example of such ceramic dielectric compositions, a ceramic dielectric ternary composition consisting of 20 to 90% by weight of strontium titanate, 3 to 60% by weight of bismuth trioxide and 5 to 60% by weight of titanium dioxide has been proposed by U.S. Pat. No. 3,352,697.

However, the ceramic dielectric compositions proposed by the prior art failed to provide satisfactory dielectric properties because both the dielectric constant and the dielectric loss largely depended upon the applied voltage.

It is a principal object of the present invention to provide a composition for a ceramic dielectric which has a high dielectric constant, as well as low dielectric loss, and exhibits reduced variation of the dielectric constant and dielectric loss with respect to a wide variation of an applied high AC or DC voltage, respectively.

Another object of the present invention is to provide a composition for a ceramic dielectric, which is dense and uniform in the sintered state.

In accordance with the present invention, there is provided a ceramic dielectric composition which comprises as a first component 35 to 93.5% by weight of strontium titanate ($SrTiO_3$), 4 to 40% by weight of bismuth trioxide ($Bi_2O_3$) and 2.5 to 60% by weight of titanium dioxide ($TiO_2$), based on the total weight of the first component and further, as a second component at least one alkali metal oxide selected from the group consisting of the oxides of lithium, sodium, potassium, rubidium and francium in an amount from 0.1 to 5.0% by weight on the total weight of the first component.

The incorporation of an alkali metal oxide into the basic ternary dielectric composition according to the present invention enhances the dielectric constant by as much as 60% at maximum compared to that of the basic ternary dielectric composition and exercises a large effect on the densification of the sintered ceramic body. Although the dielectric constant is increased to a considerable degree by the incorporation of the alkali metal oxide, neither the dielectric loss nor the variations of the dielectric constant and the dielectric loss with respect to the wide variation of the applied voltage are increased.

The strontium titanate may contain a minor amount, i.e., up to 30% by weight based on the weight of strontium oxide in the strontium titanate, of at least one other divalent metallic oxide. Illustrative of such divalent metallic oxides are those of calcium, zinc, manganese, cadmium and lead.

Similarly, the titanium dioxide, which is one of the basic three components of the invention, and the titanium dioxide, which is also a constituent of one of the basic three components, i.e. $SrTiO_3$, may contain a minor amount, i.e., up to 30% by weight based on the weight of the titanium dioxide, of at least one of the tetravalent metallic oxides. Illustrative of such tetravalent metallic oxides are those of zirconium, tin and hafnium.

It is advantageous to incorporate into the composition of the present invention a minor but effective amount of a mineralizer. Such mineralizer is selected from (a) at least one of oxides of manganese, chromium, iron, cobalt, nickel, niobium and tantalum, (b) a clay material and (c) at least one of the rare earth metal oxides.

The manganese oxide used as the mineralizer includes for example manganous oxide (MnO), dimanganese trioxide ($Mn_2O_3$) and manganese carbonate ($MnCO_3$). The chromium oxide includes for example, chromite and chromium trioxide ($Cr_2O_3$). The iron oxide used as the mineralizer includes for example, hematite, magnetitie, goethite and ferrous hydroxide. The niobium oxides include for example, niobium pentoxide ($Nb_2O_5$).

The rare earth metal oxides include for example the oxides of the rare earth elements, such as lanthanum, cerium, neodymium and samarium.

The mineralizer improves the sintering process of ceramic so that a denser and more uniform ceramic can be fabricated. By the term "clay material" used herein is meant silicate hydrate minerals which generally contain about 41 to about 53% by weight of $SiO_2$ and about 31 to about 39% by weight of $Al_2O_3$.

The present invention will be illustrated in detail by way of examples in which all "%" and "parts" are by weight.

EXAMPLE 1

Predetermined quantities of strontium carbonate ($SrCO_3$) and titanium dioxide ($TiO_2$) were mixed so that they amount to 100 parts, and pre-sintered at 1150° C for 2 hours. Then the pre-sintered mixture was ground into powder, whereby strontium titanate ($SrTiO_3$) powder was obtained. The $SrTiO_3$ was then mixed with $Bi_2O_3$, $TiO_2$, $Li_2CO_3$ and $Na_2O$ in the predetermined proportions as indicated in columns 1 and 2 of the Table I below.

Each mixture so obtained, after adding an adequate amounts of binder, was pressed and shaped into discs of 16.5 mm diameter and 10 mm thickness. And then, the discs were sintered at 1100° to 1300° C for 2 hours and, thus, sintered ceramic bodies were obtained. The sintered ceramic bodies were plated with silver electrodes and then were subjected to the measurements of the dielectric constant ($\epsilon$) at 1 KHz and 5 volt A.C., the dielectric loss (tan $\delta$) at 1 KHz and 5 volt A.C., and dependencies of the dielectric constant and the dielectric loss upon the variation of voltage. The dependency of the dielectric constant upon the voltage variation is expressed by $\Delta C/C_1$ calculated from the following formulae.

Percentage $\Delta \dfrac{C}{C_1} =$ $$\dfrac{[\epsilon]\genfrac{}{}{0pt}{}{\text{at AC 5 V}}{\text{(at 1 KHz)}} - [\epsilon]\genfrac{}{}{0pt}{}{\text{at AC 0.5 KV/mm}}{\text{(at 50 Hz)}}}{[\epsilon]\genfrac{}{}{0pt}{}{\text{at AC 5 V}}{\text{(at 1 KHz)}}} \times 100$$

The dielectric loss at an alternating current of 50 Hz is expressed by $$\tan \delta \left[\begin{array}{c}\text{at AC 0.5 KV/mm}\\ \text{at 50 Hz}\end{array}\right].$$

The dielectric constant ($\epsilon$), the dielectric loss (tan $\delta$), the dependency of the dielectric constant upon the variation of voltage ($\Delta C/C_1$) and the dielectric loss at an alternating current $$\tan \delta \left[\begin{array}{c}\text{at AC 0.5 KV/mm}\\ \text{at 50 Hz}\end{array}\right]$$

are shown in Table I.

high dielectric constant ($\epsilon$) amounting to from about 500 to about 1600 and low dielectric losses varying within the range of about 0.03 to 0.5% (tan $\delta$ 1 KHz) and about 0.1 to 0.55%

$$\left(\tan \delta \left[\begin{array}{c}\text{at AC 0.5 KV/mm}\\ \text{at 50 Hz}\end{array}\right]\right),$$

and exhibit little or no variation of dielectric properties due to the voltage variation. It will be apparent from these results that the ceramic dielectric compositions according to the present invention possess superior dielectric properties over the compositions which do not fall within the range of the present invention.

The specimens containing more than 93.5 parts of SrTiO$_3$ (Nos. 1 and 2) or less than 35 parts were found to possess dielectric constants decreased below 500 and thus can not be used practically as ceramic dielectrics. The ceramic compositions containing more than 40 parts of Bi$_2$O$_3$ are generally recognized as being too porous to use practically as ceramic dielectrics, and the specimens containing less than 4.0 parts of Bi$_2$O$_3$ (Nos. 1 and 2) exhibit a low dielectric constant and, thus, are not preferable. The specimens No. 17, 18 and 19 show that a dielectric constant decreases with an increase in content of TiO$_2$. Thus, specimen No. 19 containing 60 parts of TiO$_2$ has an undesirably low dielectric constant. On the other hand, the ceramic mixture containing less than 2.5 parts of TiO$_2$ is generally recognized as being incapable of being formed into a desirably dense ceramic body. The ceramic compositions containing less than 0.1 part of alkali metal oxide (Specimens No. 3, 4, 10, and 15) do not have as remarkable an improved dielectric constant as compared with the specimen containing more than 0.1 parts of the alkali metal oxide. The dielectric constant increases with an increase in the content of the alkali metal oxide as is observed in the Table I

| | Composition and Properties of Ceramic Dielectrics | | | | | | | |
|---|---|---|---|---|---|---|---|---|
| | 1 | | | 2 | | 3 | 4 | 5 |
| Specimen No. | Proportion of basic metal oxides (parts) | | | Proportion of alkali metal oxides (parts) | | $\epsilon$ 1(KHz) | tan $\delta$ % (1KHz) | $\Delta \dfrac{C}{C_1}$ | tan $\delta$ [at AC 0.5KV/mm at 50Hz] |
| | SrTiO$_3$ | Bi$_2$O$_3$ | TiO$_2$ | Li$_2$O | Na$_2$O | | | | |
| 1 (Control) | 95 | 3.0 | 2.0 | 0 | 0 | 378 | 0.03 | +0.1 | 0.04 |
| 2 (Control) | 95 | 3.0 | 2.0 | 0.41 | 0 | 405 | 0.04 | +0.4 | 0.06 |
| 3 (Control) | 93 | 4.6 | 2.5 | 0 | 0 | 558 | 0.03 | +0.2 | 0.08 |
| 4 (Control) | 93 | 4.5 | 2.5 | 0.04 | 0 | 560 | 0.03 | +0.2 | 0.1 |
| 5 (Invention) | 93 | 4.5 | 2.5 | 0.12 | 0 | 585 | 0.03 | +0.2 | 0.1 |
| 6 (Invention) | 93 | 4.5 | 2.5 | 0.21 | 0 | 620 | 0.04 | +0.2 | 0.1 |
| 7 (Invention) | 93 | 4.5 | 2.5 | 0.41 | 0 | 670 | 0.04 | +0.2 | 0.1 |
| 8 (Invention) | 93 | 4.5 | 2.5 | 1.21 | 0 | 720 | 0.07 | +0.3 | 0.15 |
| 9 (Invention) | 93 | 4.5 | 2.5 | 2.02 | 0 | 715 | 0.15 | +1.8 | 0.25 |
| 10 (Control) | 72.7 | 18.2 | 9.1 | 0 | 0 | 960 | 0.1 | +0.7 | 0.2 |
| 11 (Invention) | 72.7 | 18.2 | 9.1 | 1.09 | 0 | 1560 | 0.1 | +1.2 | 0.37 |
| 12 (Invention) | 72.7 | 18.2 | 9.1 | 1.84 | 0 | 1110 | 0.2 | +1.4 | 0.55 |
| 13 (Invention) | 72.7 | 18.2 | 9.1 | 3.68 | 0 | 982 | 0.33 | +2.0 | 0.5 |
| 14 (Control) | 81 | 14 | 5 | 0 | 0 | 765 | 0.1 | +0.2 | 0.1 |
| 15 (Invention) | 81 | 14 | 5 | 0.41 | 0 | 940 | 0.11 | +2.0 | 0.2 |
| 16 (Invention) | 81 | 14 | 5 | 1.21 | 0 | 1040 | 0.11 | +0.8 | 0.22 |
| 17 (Invention) | 68 | 20 | 12 | 1.01 | 0 | 1485 | 0.13 | +1.3 | 0.42 |
| 18 (Invention) | 50 | 10 | 40 | 1.22 | 0 | 687 | 0.12 | +0.4 | 0.3 |
| 19 (Control) | 30 | 10 | 60 | 1.01 | 0 | 390 | 0.45 | +0.1 | 0.65 |
| 20 (Control) | 30 | 30 | 40 | 0.81 | 0 | 193 | 0.37 | +2.8 | 0.7 |
| 21 (Control) | BaTiO$_3$ 88.0 | Bi$_2$(SnO$_3$)$_3$ | 12.0 | 0 | 0 | 1600 | 1.2 | +45.0 | 12.0 |
| 22 (Control) | 72.7 | 18.2 | 9.1 | 6.0 | 0 | 473 | 1.8 | +5.2 | 3.2 |
| 23 (Invention) | 72.7 | 18.2 | 9.1 | 0 | 0.5 | 1380 | 0.2 | +1.5 | 0.3 |
| 24 (Invention) | 72.7 | 18.2 | 9.1 | 0 | 2.5 | 1490 | 0.2 | +1.7 | 0.3 |

Remarks:
Li CO is decomposed to Li O during the succeeding sintering and, thus, the Li O is incorporated in the form of Li CO in this example. The amount of Li CO incorporat As is clear from the Table I, the ceramic dielectric compositions according to the present invention have a specimens numbered 5, 6, 7, 8, 9, 10, 11, 15 and 16. However, the ceramic composition containing more than 5.0 parts of the alkali metal oxide (Specimen No. 22) exhibits a low dielectric constant and an increased dielectric loss.

EXAMPLE 2

The procedure of Example 1 was repeated, wherein, various mineralizers in amounts as indicated in the column 2 of Table II are separately added to the ceramic mixture containingg 72.7 parts of $SrTiO_3$, 18.2 parts of $Bi_2O_3$, 9.1 parts of $TiO_2$ and 2.7 parts of $Li_2CO_3$ (Specimen No. 11) with all other conditions remaining substantially the same. In this Example, four kinds of the mineralizer were selected, i.e., manganese carbonate ($MnCO_3$), dichromium trioxide ($Cr_2O_3$), Gairome clay and lanthanum trioxide ($La_2O_3$). Gairome clay is a type of clay found in Japan and by analysis, was found by composed of 48.46% of $SiO_2$, 36.67% of $Al_2O_3$, 1.35% of $Fe_2O_3$, 0.88% of CaO and 0.20% of MgO, and had an ignition loss of 12.94%. The columns 3, 4 and 5 of Table II indicate electrical characteristics, and are the same as the corresponding columns in Table I. Specimen No. 11 is inserted into Table II to clarify the differences between the electrical characteristics of the specimens with the mineralizer and the specimen without mineralizer.

As is clear from table II, the electrical characteristics of the specimens 25 through 35 are not essentially improved. However, it was found that the addition of mineralizer prevented the ceramic dielectric from being reduced during sintering and resulted in a far denser sintered body.

The forms of the mineralizers to be added to the basic metal oxide composition are neither critical nor limited to those shown in column 2 of the Table. For example, the mineralizers $MnCO_3$ and $Cr_2O_3$ can be added in the form of MnO and other chromium oxides, respectively. The upper critical amount of the mineralizer added was proved to be not more than 0.5% (but greater than 0%) in terms of the oxide, based on the total weight of basic metal oxide composition in order to prevent deterioration in the electrical characteristics of the ceramic dielectrics. The mineralizer should preferably be added in the range of from 0.1 to 0.3% in order to provide to the sintered body both excellent sintering capability and electrical characteristics. The mineralizer added in an amount below this range did not improve at all the density and uniformity of the sintered body, while the mineralizer added in an amount exceeding this range brought about adverse effects on the electrical properties.

In the above Examples, one of the alkali metal oxides, $Li_2O$, is added in the starting mixture in the form of the carbonate. However, it should be noted that other forms can be utilized and, further, that other oxides can be added in the form of carbonates or other compounds.

Table II

Composition and Properties of Ceramic Dielectrics Added with Mineralizer

| Specimen No. | Proportion of Oxides (1) | | | | Proportion of Mineralizer (2) | | | | 3 ε (1KHz) | 4 tanδ % (1KHz) | 5 | |
|---|---|---|---|---|---|---|---|---|---|---|---|---|
| | $SrTiO_3$ (parts) | $Bi_2O_3$ (parts) | $TiO_2$ (parts) | $Li_2O$ (parts) | $MnCO_3$ (%) | $Cr_2O_3$ (%) | Gairome clay (%) | $La_2O_3$ (%) | | | $\Delta \frac{C}{C_1}$ | $\tan\delta$ at AC 0.5KV/mm at 50Hz |
| 11 | 72.7 | 18.2 | 9.1 | 1.09 | — | — | — | — | 1560 | 0.1 | +1.2 | 0.37 |
| 25 | 72.7 | 18.2 | 9.1 | 1.09 | 0.2 | — | — | — | 1572 | 0.1 | +1.0 | 0.22 |
| 26 | 72.7 | 18.2 | 9.1 | 1.09 | 0.3 | — | — | — | 1566 | 0.1 | +1.3 | 0.40 |
| 27 | 72.7 | 18.2 | 9.1 | 1.09 | 0.5 | — | — | — | 1530 | 0.2 | +1.4 | 0.55 |
| 28 | 72.7 | 18.2 | 9.1 | 1.09 | — | 0.2 | — | — | 1543 | 0.1 | +1.1 | 0.40 |
| 29 | 72.7 | 18.2 | 9.1 | 1.09 | — | 0.3 | — | — | 1530 | 0.1 | +1.8 | 0.45 |
| 30 | 72.7 | 18.2 | 9.1 | 1.09 | — | 0.5 | — | — | 1528 | 0.22 | +2.0 | 0.65 |
| 31 | 72.7 | 18.2 | 9.1 | 1.09 | — | — | 0.2 | — | 1540 | 0.1 | +1.3 | 0.3 |
| 32 | 72.7 | 18.2 | 9.1 | 1.09 | — | — | 0.3 | — | 1527 | 0.1 | +1.2 | 0.22 |
| 33 | 72.7 | 18.2 | 9.1 | 1.09 | — | — | 0.5 | — | 1480 | 0.1 | +1.3 | 0.25 |
| 34 | 72.7 | 18.2 | 9.1 | 1.09 | — | — | — | 0.2 | 1530 | 0.1 | +1.1 | 0.2 |
| 35 | 72.7 | 18.2 | 9.1 | 1.09 | — | — | — | 0.5 | 1478 | 0.1 | +1.1 | 0.2 |

EXAMPLE 3

The procedure of Example 1 was repeated, wherein the ceramic mixture containing 72.7 parts of $SrTiO_3$, 18.2 parts of $Bi_2O_3$, 9.1 parts of $TiO_2$ and 2.7 parts of $Li_2CO_3$ (Specimen No. 11) was modified to partially replace the divalent or tetravalent metallic oxides by other divalent or tetravalent metallic oxides, respectively, in the following way. The strontium carbonate $SrCO_3$ was mixed with MgO or CaO in a weight percent indicated in column 2 of Table III based on the weight of $SrCO_3$ expressed in terms of the weight of SrO. In Specimens No. 39 and 40, the tetravalent titanium oxide, which is one of the basic three compositions, was partially replaced by $ZrO_2$ in a weight percent indicated in column 2 of Table III. The specimen No. 11 is inserted into Table III to clarify the difference between the electrical characteristics of the specimen 11 and specimens 36 through 40.

Table III

Composition and Properties of Ceramic Dielectrics Containing $SrTiO_3$ and $TiO_2$ Partially Replaced by the Oxide of the Metal of the Same Valency.

| Specimen No. | Proportion of Oxides (1) | | | | Proportion of Substitution | | | 2 ε (1Khz) | 3 tan δ % (1KHz) | 4 | |
|---|---|---|---|---|---|---|---|---|---|---|---|
| | $SrTiO_3$ (%) | $Bi_2O_3$ (%) | $TiO_2$ (%) | $Li_2O$ (%) | MgO (%) | CaO (%) | $ZrO_2$ (%) | | | $\Delta \frac{C}{C_1}$ | $\tan\delta$ at AC 0.5 KV/mm at 50Hz |
| 11 | 72.7 | 18.2 | 9.1 | 1.09 | — | — | — | 1560 | 0.1 | +1.2 | 0.37 |
| 36 | " | " | " | " | 10 | — | — | 1540 | 0.1 | +1.1 | 0.2 |
| 37 | " | " | " | " | — | 10 | — | 1510 | 0.1 | +1.1 | 0.2 |
| 38 | " | " | " | " | — | 20 | — | 1480 | 0.1 | +0.8 | 0.15 |
| 39 | " | " | " | " | — | — | 10 | 1450 | 0.15 | +1.2 | 0.2 |
| 40 | " | " | " | " | — | — | 20 | 1380 | 0.2 | +1.2 | 0.3 |

As is clear from columns 2, 3 and 4 of Table III, the electrical characteristics of the specimens 36 through 40 are as good as those of the specimen 11.

Contrary to this, when the metallic oxides which are the constituents of the basic three components of the invention, were replaced by the oxides of the other metals having the same valency as the former metals in amounts exceeding 30%, the ceramic dielectric obtained possessed a decreased dielectric constant and an increased dielectric loss.

What I claim is:

1. A ceramic dielectric composition containing as a first component 35 to 93.5% by weight of strontium titanate, 4 to 40% by weight of bismuth trioxide and at least 2.5 but less than 60% by weight of titanium dioxide based on the first component, wherein said composition further contains as a second component at least one alkali metal oxide selected from the group consisting of the oxides of lithium, sodium, potassium, rubidium and cesium, in an amount from 0.1 to 5.0% by weight based on the total amount of said first component.

2. A ceramic dielectric composition according to claim 1, wherein not more than 30% by weight of the strontium oxide in the strontium titanate is replaced by at least one divalent metallic oxide selected from the group consisting of the oxides of calcium, zinc, magnesium, berylium, barium, cadmium and lead.

3. A ceramic dielectric composition according to claim 1, wherein not more than 30% by weight of the titanium oxide is replaced by at least one tetravalent metallic oxide selected from the group consisting of the oxides of zirconium, tin and hafnium.

4. A ceramic dielectric composition according to claim 2, wherein not more than 30% by weight of the titanium oxide, is replaced by at least one tetravalent metallic oxide selected from the group consisting of the oxides of zirconium, tin and hafnium.

5. A ceramic dielectric composition according to claim 1, wherein said dielectric ceramic composition further contains as a third component a minor but effective amount of at least one of the following:
   (a) at least one oxide selected from the group consisting of oxides of manganese, chromium, iron, cobalt, nickel, niobium and tantalum;
   (b) a clay material, and;
   (c) at least one of the rare earth oxides.

6. A ceramic dielectric composition according to claim 3, wherein said dielectric ceramic composition further comprises as a third component a minor but effective amount of at least one of the following:
   (a) at least one oxide selected from the group consisting of oxides of manganese, chromium, iron, cobalt, nickel, niobium and tantalum;
   (b) a clay material, and;
   (c) at least one of the rare earth oxides.

7. A ceramic dielectric composition according to claim 5, wherein not more than 30% by weight of the titanium oxide, is replaced by at least one tetravalent metallic oxide selected from the group consisting of the oxides of zirconium, tin and hafnium.

* * * * *

UNITED STATES PATENT OFFICE
CERTIFICATE OF CORRECTION

Patent No. 4,119,554   Dated October 10, 1978

Inventor(s) Shinobu Fujiwara

It is certified that error appears in the above-identified patent and that said Letters Patent are hereby corrected as shown below:

In Columns 3 and 4 following Table I, under "Remarks":

change "Li CO" to --$Li_2CO_3$-- (all three occurrences);

change "Li O" to --$Li_2O$-- (both occurrences);

change "incorporat" to --incorporated-- and then insert --is expressed in terms of the amount of $Li_2O$.--.

Signed and Sealed this

Twenty-fourth Day of July 1979

[SEAL]

Attest:

Attesting Officer

LUTRELLE F. PARKER
Acting Commissioner of Patents and Trademarks